United States Patent [19]
Clements et al.

[11] Patent Number: 6,084,995
[45] Date of Patent: Jul. 4, 2000

[54] REDUCING SCANNING ERRORS

[75] Inventors: Stephen John Clements, Stansted; Sebastian John Savory, Churchill College, both of United Kingdom

[73] Assignee: Nortel Networks Corporation, Montreal, Canada

[21] Appl. No.: 08/994,581

[22] Filed: Dec. 19, 1997

[51] Int. Cl.[7] .................................................. G02B 6/34
[52] U.S. Cl. ............................ 385/37; 385/10; 385/123
[58] Field of Search ............................. 385/37, 10, 123, 385/27; 359/569

[56] References Cited

U.S. PATENT DOCUMENTS

| | | | |
|---|---|---|---|
| 4,974,930 | 12/1990 | Blyer, Jr. et al. | 385/37 |
| 5,104,209 | 4/1992 | Hill et al. | 385/27 |
| 5,830,622 | 11/1998 | Canning et al. | 385/37 X |
| 5,912,999 | 6/1999 | Brennan, III et al. | 385/37 |

FOREIGN PATENT DOCUMENTS

| | | | |
|---|---|---|---|
| 2 289 770 | 11/1995 | United Kingdom | 385/37 |
| WO 97/22023 | 6/1997 | WIPO . | |

*Primary Examiner*—Phan T. H. Palmer
*Attorney, Agent, or Firm*—Lee, Mann, Smith, McWilliams, Sweeney & Ohlson

[57] ABSTRACT

The use of regularly repeated small sections of pattern in making a complete optical grating may generate unwanted effects, such as side lobes, as a result of the regular repetition of defects in the small sections. Methods are described for disrupting the regularity of the occurrence of such defects in a grating made of a plurality of sections, thereby minimizing the likelihood of the occurrence of unwanted side lobes, for example.

5 Claims, 2 Drawing Sheets

REDUCING SCANNING ERRORS

FIELD OF THE INVENTION

The present invention relates to a method for use in scanning relatively large areas, and to articles, for example optical fibre gratings, made by means of the method.

BACKGROUND OF THE INVENTION

Scanning relatively large areas may be accomplished by scanning small areas (sometimes called "patches") of the large areas, in turn, employing a stepping operation in which the scanning of each subsequent patch or small area begins at the boundary, or the end, of a previous small area. This type of scanning is known as double mode "stitching", and the patches are ideally stitched together so that they abut exactly. Each of the small areas is usually scanned by a beam of photons, electrons, ions, or other particles, and the operation of stepping from one small area to the next may be effected by mechanical means. Stitching errors may arise when the abutment of two areas is inaccurate, as a result of one small area not beginning exactly at the boundary line of the previous small area. There may, for example be a gap, or an overlap. The small areas may typically, but not necessarily, incorporate sets of scanning or grating lines which are spaced by less than one micron from one another.

SUMMARY OF THE INVENTION

For regularly repeated patterns used in optical fibre gratings, stitching or abutment errors can cause phase errors which, unless they are minimised or suppressed, may affect the performance of a grating. Multiple stitching is required when a grating extends over a large area, for example an area having a length of 2 cm. Scanning mechanisms are generally able to cater only for lengths of around 4 mm. in a direction perpendicular to the grating lines.

It has been found that the undesirable effect of any stitch error, which occurs at regular intervals along the length of a grating, is magnified when the grating is scanned. This can lead to the constructive reinforcement of any phase defect. For example in optical fibre gratings, the regular occurrence of phase defects generates strong side lobes at wavelengths differing from the Bragg wavelength of the grating. A feature of embodiments to be described below, in illustration of this invention, is that the possibility that stitch errors might be reinforced is minimised, as a result of a disruption in the regularity of the occurrence of phase defects. Disruption of the spatial regularity of the phase defects has been shown to dissipate the effect of any phase discontinuity, and to keep the strength of any side lobes produced by an optical fibre grating to a minimum.

DETAILED DESCRIPTION OF THE INVENTION

Figure 1:
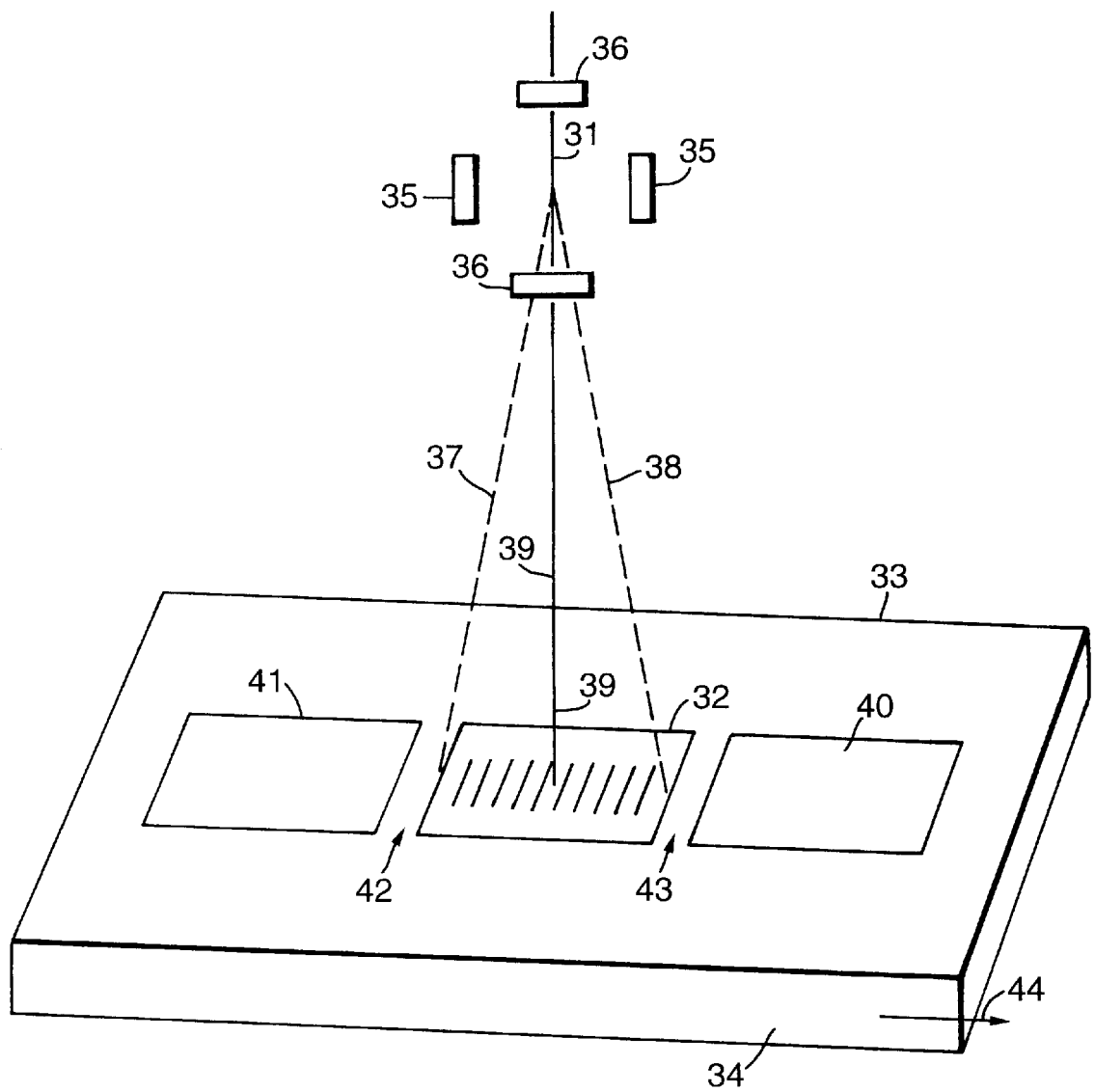
FIG. 1 is a diagrammatic perspective view of a previously proposed arrangement for use in making a phase mask.

Referring to FIG. 1, there is shown a scanning electron beam 31 which is arranged to scan a rectangular area 32 on a horizontal working surface 33 of a movable table 34. The beam 31 can be deflected in an X-direction between extremes 37, 38 by electrostatic deflector plates 35, or in a Y-direction by electrostatic deflector plates 36, from a central beam path shown at 39. The table 34 is movable in the X-direction, as indicated by the arrow 44. Thus, for example, were an optical fibre waveguide target to extend over the whole area of the table 34, the scanning beam 31 would first scan the area 40, then the area 32 and subsequently the area 41.

The X- and Y-scanning by the beam 31 forms a part of a process for use in producing sections of a grating for use in an optical fibre waveguide. A grating may be required which is longer in the X-direction than is any one of the single areas 32, 40, 41 that it is possible for the electron beam 31 to scan.

In such a situation, it is necessary to make successive exposures of the areas 32, 40, 41.

Ideally, the table is moved and stopped, for each respective electronic scan by the beam 31 of the areas 32, 40, and 41 successively, in such a way that the spaces 42 and 43, which are shown exaggeratedly between the respective areas 32 and 40, and 40 and 41, do not exist, and in such a way that none of these areas overlaps one another. However, these ideal conditions are rarely achieved, and either intervening spaces, such as those shown exaggeratedly at 42, 43, or overlaps of the areas, do occur in such step and repeat methods at regular spatial intervals along the direction of relative movement between the source of the beam 31 and the areas 32, 40, 41.

The occurrence at regular intervals of imperfections, such as spaces 42, 43, which can create unwanted chirp, and produce interfering side lobes in diffraction or reflection patterns obtained from a coherent beam reading the scanning or grating pattern are governed by the lengths of the areas 32, 40, 41 in the X-direction.

The step and repeat procedure described above has been proposed previously for the production of a mask, which is several sections long, in silica for making optical fibre gratings. The mask is, in turn, used to manufacture gratings which are liable to have the above-mentioned chirp and side lobe problems.

It has been proposed to install gratings, which have been made using the above-mentioned procedure, in a wall of a fibre optical waveguide, with the grid elements or lines extending across the direction of the longitudinal axis of the waveguide.

A grating may be made in two steps. A mask being first produced in a silica substrate using an electron beam, as described with reference to FIG. 1, or optically using a laser and a photo-resist process. Then a final pattern is produced from the mask grating, e.g. by interference, to match the pattern of the desired final grating for an optical fibre waveguide.

In the specification of U.S. Pat. No. 5,104,209, which was published on Apr. 14, 1992, there was proposed a method of creating an index grating in an optical fibre which included the steps of disposing a slit mask over a side of an optical fibre, and illuminating the fibre through the slit mask using substantially monochromatic ultraviolet light for a short interval of time, whereby an index line was created and stored in the core of the fibre. To produce a full grating the fibre and the mask were moved axially relative to one another.

In arrangements to be described below, by way of example in illustration of the present invention, it is accepted that imperfections in the form either of intervening spaces between scanned areas, or of overlaps of scanned areas may occur, and it is proposed to make it more likely that imperfections in the form of intervening spaces or overlaps occur at irregular, or random, partial intervals, but preferably not at intervals having a harmonic relationship. To take care of this latter condition, each series of random intervals is checked, in one arrangement, in order to exclude any with a harmonic relationship to those of other areas to be scanned.

In one particular arrangement to be described below, as an example in illustration of the present invention, a grating has stitching gaps which are made to occur at irregular intervals by arranging that some or all of the lengths of the small areas or "patches" differ in the direction of "stepping", and moreover are ideally not harmonically related at all, or are at least totally random as to length in the stepping direction. The expense which would otherwise be needed in order to provide very precise stitching is thus avoided, although any need to sense and eliminate those arbitrary or random patch lengths which may be found to be harmonically related would involve an additional step.

In another arrangement which is to be described and which is illustrative of the invention, there are two or more gratings. The gratings which are to be combined in order to function have the same spacing or cooperable spacings between the line elements. By arranging that the two or more gratings each has a different patch length from the others, different stitch periods are obtained and the random effect is obtained.

A third embodiment differs from the second in that each individual grating has varying patch lengths (as in the first embodiment) and the patch lengths differ between the two or more gratings. This combines the advantages of the first and second embodiments.

The second or third embodiment may use coupled Mach-Zehnder devices to form a Michelson interferometer. One four port 3 dB coupler is used to split an input, at one port, e.g. a wideband signal, between two further ports, from which the signal is then passed along two optical waveguide paths to two respective reflecting gratings in the side-walls of the fibres. The gratings have the same line spacings, i.e. similar densities of line elements and total lengths but have different intervals between stitch errors (e.g. different patch lengths) from each other. The amplitudes and phrases at which the split signals are fed to the gratings are made as identical as possible, e.g. by means for trimming the optical waveguides. A reflected wavelength $\lambda_1$ is reinforced in the signal exiting the fourth port of the coupler, and likewise the transmitted wavelengths $\lambda_2 \ldots \lambda_N$ reinforce in one port of a second 3 dB cross-coupler, and the thus combined reflected and thus combined transmitted signals have only small disruptions arising from stitching errors. The stitch intervals within each grating may be regular as already described for the second embodiment, so long as they are different for the two gratings. Alternatively the stitch intervals within each grating may be irregular as described above for the third embodiment with the result that filtering is less disrupted by stitch errors.

Stitch errors in electron lithography and other scanned systems produce side lobes and sometimes other defects in the spectral response of the gratings formed by a scanning system, or via an intermediary generated by a scanning system. In the embodiments to be described, a disruption in the regularity of the stitch errors is produces in order to reduce the effect of the stitch errors. The effect of arranging that the stitch errors occur randomly is to reduce the size of any spectral side lobes and other defects.

Figure 2:
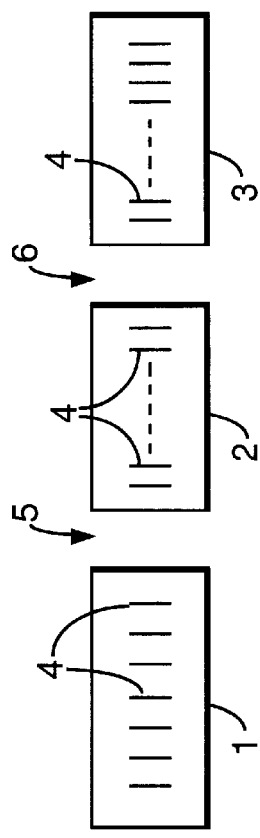
FIG. 2 shows in plan view, and not to scale, two stitching errors due to three non-abutting sections or patches of a sub grating pattern and the compensation of the errors.

Referring to FIG. 2, there is shown an example which is similar to that of the first embodiment, in which three patches or pattern sections 1, 2 and 3 of relatively small area participate with other patches not shown in making a grating having an area which is large compared with the area of a single patch. Spaced parallel lines 4 on the patches or pattern sections are very close together, the spacing being typically, but not necessarily of the order of a micron or less, and ideally the line spacing is the same for each patch, although it may be varied randomly, or according to a rule, from one patch or pattern section to the next. Unfortunately, stitching errors which are illustrated by gaps such as 5 and 6 exist between the small patches or pattern sections 1 to 3. The sequence of lines therefore has a discontinuity between the pattern on one patch and that on the next. If the lengths of the sections 1, 2 and 3 are equal, it is found that the gratings generate relatively large side lobes in resultant diffraction patterns. In this particular embodiment which is suitable for use in illustrating the invention, the length of each patch or small section 1, 2 and 3 is different from that of the others, indeed it is as arbitrary as possible, with the desirable achievement that the effects of the discontinuities are reduced. The lengths of the small areas or patches such as 1, 2 and 3 are therefore all made different, and are preferably not related harmonically, for example the lengths are related only by being the product of a constant and a unique prime number (i.e. not common to any other patch), or all the patch lengths are completely arbitrary. In FIG. 2 the difference in the lengths of the patches is shown greatly exaggerated, to demonstrate the principle. In practice the required differences would be much less, and would be determined by experiment or computer prediction.

Thus the prejudicial stitching errors, resulting from gaps such as 5 and 6, are reduced. As explained above stitching errors may result from overlapping rather than, or in addition to non-abutment of, or spacing 5 and 6 between the patches, and both are mitigated in the embodiments described in the same way by making the stitching errors inconsistent with each other, e.g. arbitrary or very variable in their intervals of occurrence. If the lengths of the patches are arbitrarily generated from a random function, it is additionally advantageous to sense whether or not there are accidentally occurring harmonically related patch lengths, and for those patches to be suppressed or deleted in some way.

Figure 3:
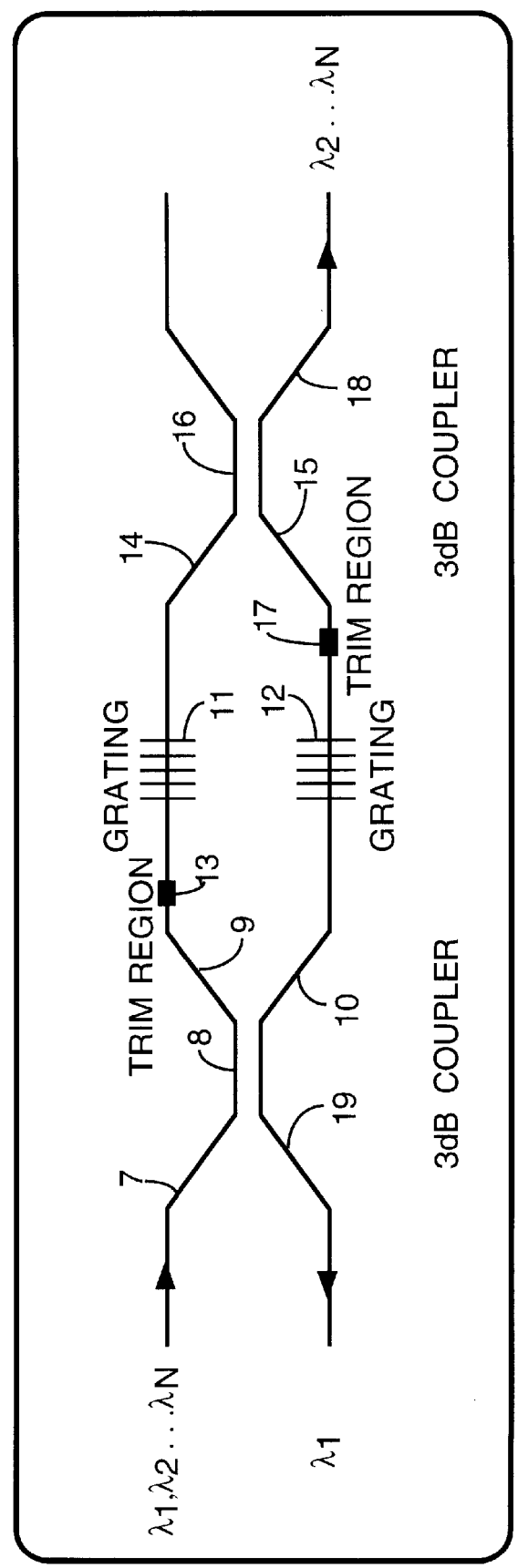
FIG. 3 shows schematically a two grating interference arrangement.

FIG. 3 shows a schematic diagram which enables the second and third embodiments to be described. Each embodiment has two gratings each with a different stitch period from the other, but otherwise being arranged and fed via waveguide paths in similar ways, the gratings combining in effect to produce more precise wavelength filtering. The elements of the gratings may have equal pitches, or their pitches may be related to cooperate so that the two gratings combine together to provide an overall uniform effect.

The embodiment shown in FIG. 3 includes two complete gratings 11, 12 having different stitching lengths (not visible) interacting together as diffraction filters. Referring to FIG. 3, a composite signal containing N wavelengths, $\lambda_1$, $\lambda_2 \ldots \lambda_N$, is incident at a first arm 7 of a 3 dB optical coupler 8 and the signal is divided equally along the paths 9 and 10 to first and second diffraction gratings 11 and 12. One or both of the feeds has an adjustable trim region 13 so that the divided signals can be made to reach the gratings with similar amplitudes and phrases. Components at one wavelength, $\lambda_1$, say, will be reflected by both gratings, 11, 12 to reinforce each other selectively along the fourth path 11 of the coupler 8, due to the trimming and to the properties of diffraction gratings of specified density of lines. Also the remaining wavelengths $\lambda_2 \ldots \lambda_N$ are transmitted by both gratings 11, 12 along paths 14, 15, of a second 3 dB coupler 16, the feed along one path, e.g. 15 being through a further trim region 17 to adjust both amplitude and phase, whereby the signal at wavelengths $\lambda_2 \ldots \lambda_N$ tend to reinforce along path 18 of the coupler, i.e. the $\lambda_1$ component is not present on path 18.

Thus the interferometer selects energy at wavelength $\lambda_1$ by wave interference and directs the energy selectively along path 19 of the first coupler and selects energy at the remaining wavelengths $\lambda_2 \ldots \lambda_N$ and directs it selectively along path 18 of the second coupler. A high proportion of the light energy reaches its destined path whether 18 or 19. The arrangement is known as a Michelson interferometer, employing a well established principle.

The gratings 11 and 12 will normally each have been made by scanning small areas or patches at a time as aforesaid, each involving stitching errors as the pattern is mechanically stepped from one small area to another small area, to achieve the writing of the whole of the gratings 11 and 12. If stitching errors are similar or identical between the two gratings, there will tend to be reinforcement of stitching errors by the interference, such that parasitic sidelobe energy caused by sampling at the stitching frequency resulting from scanning may be appreciable, disruptive or otherwise excessive. Accordingly, the stitching errors, i.e. the patch length of grating 11 is made in this embodiment deliberately different from that of grating 12, even if the stitching errors are regular or uniform within each grating.

It is not necessary, in this embodiment, to have non-uniform stitching errors within each grating, i.e. patch lengths within each grating 11 and 12, as was illustrated by 1, 2, 3 of FIG. 2. In this way the optical advantages of reduced parasitic sidelobe presence and reduced energy waste and optical disruption or excess unwanted interference are greatly improved. Such devices fall into a third category of embodiments. The invention is also applicable to other multi-grating devices not being Michelson interferometer devices, where each grating is similar except as regards stitch errors or patch lengths.

The above are examples illustrative of the invention given by way of example and employing three categories of embodiment. It will be understood that variations and modifications thereof, as well as other embodiments, may be made within the scope of the protection sought.

What is claimed is:

1. A method of writing a grating of grating elements in a succession of substantially abutted short sections of grating elements, wherein constructive reinforcement of phase defects in the grating arising from stitch errors in abutment of adjacent sections is suppressed by creating the grating from short sections some or all of which differ from each other in length.

2. A method as claimed in claim 1, wherein each of the short sections has a length different from that of each of the other short sections.

3. A method as claimed in claim 1, wherein the lengths of the short sections have no harmonic relationship with each other.

4. A method as claimed in claim 1, wherein the length of each short section is a prime number multiple of a given elemental length.

5. A grating made by the method claimed in claim 1.

* * * * *

UNITED STATES PATENT AND TRADEMARK OFFICE
Certificate

Patent No. 6,084,995                                                Patented: July 4, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Stephens John Clements, Essex, Great Britain.

Signed and Sealed this Twenty-Fourth Day of April, 2001.

RODNEY B. BOVERNICK
*Supervisory Patent Examiner*
Art Unit 2800